350-438 SR

[redacted] OR 3,604,785

T 4080 H

X 4084E

United States P[illegible]

3,604,785

[72] Inventors David Neil Travis; John William Berry, both of Stamford, Conn.

[21] Appl. No. 887,522
[22] Filed Dec. 23, 1969
[45] Patented Sept. 14, 1971
[73] Assignee American Cyanamid Company Stamford, Conn.

[54] WAVELENGTH SEPARATION IN MULTICOLOR FLUORESCENT MARK CODE READERS
3 Claims, 3 Drawing Figs.

[52] U.S. Cl. .......... 350/195, 350/199, 250/226
[51] Int. Cl. .......... G02b 17/08
[50] Field of Search .......... 250/71, 226; 350/165, 195, 199, 201

[56] References Cited

UNITED STATES PATENTS 3,305,293 2/1967 Offner .......... 350/201

*Primary Examiner*—Archie R. Borchelt
*Assistant Examiner*—David C. Nelms
*Attorney*—Samuel Branch Walker

ABSTRACT: An optical reader for a plurality of narrow wavelength radiation bands, for example those derived from coded inks with narrow band photoluminescent materials as the coding components, comprises two independently adjustable spherical mirrors of radius of curvature R arranged side by side and a planoconvex lens of focal length R with the convex side toward the mirrors and arranged so that the normal to the lens passes symmetrically between the two mirrors and so that the lens and mirrors are separated by a distance R. In the planar surface of the lens are situated a clear entrance aperture and several interference filters, the interference filters being arranged in one or more rows and each one passing the narrow band radiation corresponding to the photoluminescent bands of the different coding components. The spherical half mirrors are adjusted so that the entrance aperture is reflected back and forth to produce images centered on each interference filter. When an image of the entrance aperture is imaged onto a portion backed by an interference filter, the filter passes only one band of wavelengths, reflecting the others back onto the mirrors. Two of the images involve only one reflection and other sets, two, three, four, etc. With a total of four possible reflections, eight coding components can be accommodated. Behind each interference filter is a detector sensitive to light of that particular wavelength.

INVENTORS
DAVID NEIL TRAVIS
JOHN WILLIAM BERRY
BY

ATTORNEY

WAVELENGTH SEPARATION IN MULTICOLOR FLUORESCENT MARK CODE READERS

BACKGROUND OF THE INVENTION AND RELATED APPLICATIONS

Coding systems using narrow band photoluminescent materials as coding components, for example complexes of lanthanide ions of atomic number more than 57, have permitted a coding which can be secret and which appears only when illuminated by ultraviolet or other short wave radiation. When the code involves presence or absence of coding components, the number of symbols which can be coded is $2^n-1$, where $n$ is the number of coding components. Such a system is described in the Freeman and Halverson U.S. Pat. No. 3,473,027, Oct. 14, 1969.

A number of systems have been developed for reading the photoluminescence from such coded inks. As the inks may be applied to very tiny symbol marking areas, for example tiny rectangles or circles, considerable problems are encountered in providing separate detectors and filters each sensitive to one wavelength band. These detectors are of finite size and their accommodation presents a definite problem. Various solutions, such as fiber optics, time sharing, and the like, have been used, but there remains still a need for a rugged, simple optical reader which forms multiple images of the source separated according to the wavelengths of the luminescent components, detects them separately, and avoids spurious signals, excessive attenuation of radiant energy, and the like.

SUMMARY OF THE INVENTION

The present invention is directed to a simple, rugged and efficient optical reading system for separating different narrow band components of a single beam reliably and with energy losses minimized. Essentially the readout device of the present invention comprises a planoconvex lens and two halves of a spherical mirror, the two half mirrors being placed symmetrically about normal to the lens and at a distance from the lens which is equal to both the focal length of the lens and to the radius of curvature of the mirrors. The mirrors are independently adjustable as will be described below. The beam containing photoluminescent light from an irradiated symbol marking area may have on one or more bands of photoluminescent light depending on the particular coded symbol. All of the bands are very narrow, which can be produced by narrow band photoluminescers, such as, for example, complexes of lanthanide irons having an atomic number greater than 57.

The beam passes through an entrance aperture preferably in the central portion of the lens and illuminates the two mirrors, each of which then images the entrance aperture at a different place on the plane surface of the lens, striking two interference filters, one in each of two rows. It will be seen that the entrance beam illuminates both mirrors and, therefore, each mirror receives only one-half of the beam energy. At first glance this appears to represent a serious loss of energy. However, as will be pointed out in the discussion below, the multiple reflections of the images on the planoconvex mirror are rendered much more efficient because by braking up the images into tow groups the wavelength band of each group becomes much shorter than the whole band of all of the photoluminescers, and this greatly increases the efficiency and uniformity of reflection from interference filters. The savings thus achieved are much greater than the 50 percent loss resulting from the use of the two mirrors which shared the energy of the incoming beam, so that the overall efficiency in use of the energy available is markedly increased. Also, the use of two mirrors permits a much more compact instrument, which is an added advantage.

In each of the image locations is placed a narrow band interference filter passing the photoluminescent radiation of one of the coding components. Bands from the other components, if present, are, of course, reflected by the filters and again strike the two mirrors, which reimage the reflected beams onto two further points on the lens displaced from the first, at which points there are again interference filters for passing the photoluminescent band of two further components. With a maximum of two reflections, four components can be handled; with a maximum of three reflections, six; and with four, eight. In each case, where there is a particular luminescent band for a component in the beam, it will strike the portion of the lens having an interference filter passing it.

The present invention is directed to a practical instrument which is affected by the characteristics of interference filters which can be produced at the present time. In general, an interference filter which is produced by depositing multiple thin layers of materials such as, for example, dielectrics passes a very narrow band of wavelengths and reflects adjacent wavelengths. Theoretically and ideally an interference filter should reflect all wavelengths adjacent to the pass band of the filter with a high degree of efficiency and uniformity until another pass band is reached, which may be as much as an octave either side of the filter pass band center. Unfortunately, as is often the case, the state of the art in interference filters falls considerably short of the theoretical ideal. As a result, with practical interference filters the reflection of adjacent wavelength bands remains uniform for substantial distance but not for the theoretical maximum distance. As a result, if it is attempted to use interference filters extending across a very wide band, the reflecting properties do not remain constant; whereas if the wavelength bands are divided into two regions, as has been described above, a satisfactory degree of uniformity and efficiency of reflection becomes possible. Even if there were complete uniformity of reflection, the efficiency of the interference filter as a mirror is by no means 100 percent and in practice efficiencies do not exceed about 96 percent even under the best circumstances. As a result of multiple reflections, energy losses as great or in some cases considerably greater than the theoretical 50 percent loss from using a single beam to illuminate tow mirrors are incurred. For this reason, as a practical matter, even though it is theoretically feasible to use a single mirror, this introduces such serious complication from the standpoint of overall efficiency, apparatus compactness and the like, that the two mirror system described above is greatly to be preferred.

Reference has been made to the fact that certain of the images require more reflections than others even when the filters are divided into two groups. If there is a substantial difference in the efficiency of photoluminescence of some components, a maximum overall effectiveness is obtained if the weaker luminescence suffers the smaller number of reflections and vice versa.

As in all coding readers, there is a separate detector for each band which transforms radiation preferably into an electrical signal, followed by suitable processing circuits which read out the symbol in terms of its coding components. As the individual detector and the signal processing circuits are the same in the present invention as in previous readers, they are not illustrated in the drawings or in the more specific description which will follow below. In other words, the present invention deals purely with the optical portion of a reader since it does not change the other parts, though of course they are necessary and must be present.

The interference filters are sufficiently displaced so that the images striking each one do not overlap and no mixing or confusion of signals results.

The instrument is calibrated after placing the lens at the proper distance from the two spherical half mirrors by adjusting the mirrors so that the images for the single reflections and for the multiple reflections strike the proper portions of the planar side of the lens with its backing interference filter. Once this adjustment has been made, the mirrors are locked into position and a luminescent beam coming through the entrance aperture of the lens will then be distributed by the reflections to the different interference filters.

To calibrate the instrument or to effect its initial adjustment, a beam with a single component can be sent through the lens, the mirrors adjusted so that it forms an image on the correct interference filter. Then a beam of the next color is used, and so on. This initial adjustment can, of course, be made visually as each interference filter will pass only a single band of light. The adjustment is rather delicate and fine pitched screws should be used, as is common in many precise optical instruments. As the movement of mirrors by fine micrometric means is conventional, they are not shown in the drawings in order not to confuse the illustration.

Reference has been made to the use of the device of the present invention as a reader for coded inks. This is its most important field at present, but of course the instrument does not know the past history of the polychromatic beam entering the entrance aperture of the lens and so may be used as a band selector for any polychromatic beams regardless of how they were produced.

DESCRIPTION OF THE PREFERRED EMBODIMENTS

Figure 1:
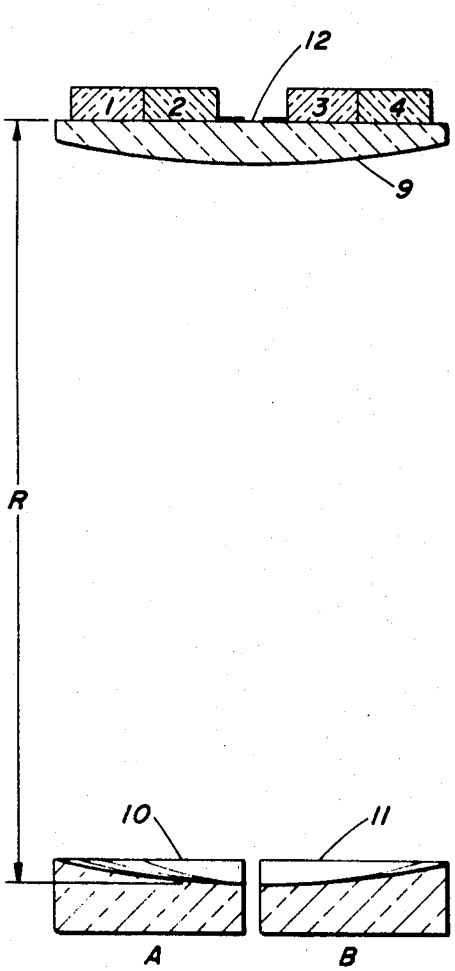
FIG. 1 is a section through the instrument showing four interference filters, the lens an the two concave mirrors.
Figure 3:
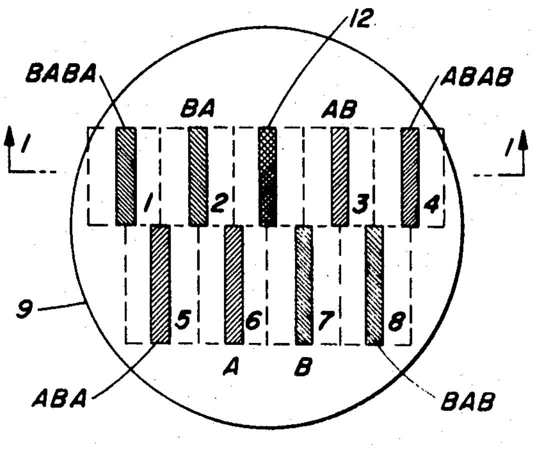
FIG. 3 is a plan view of the planar surface of the lens as seen from the position occupied by the two mirrors and showing the different images.
Figure 2:
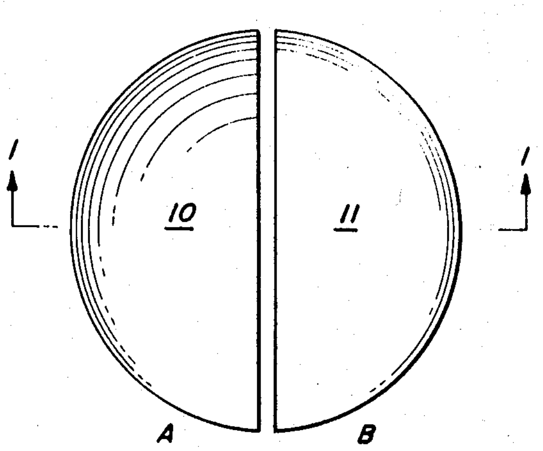
FIG. 2 is a plan view of the two spherical half mirrors.

FIG. 1 shows a section through the lens and the mirrors, the lens appearing at 9 an the two mirrors at 10 and 11. One row of interference filters, 1 2, 3 and 4, are shown in this figure, but FIG. 3 shows a second row of interference filters, 5, 6, 7 and 8, which are staggered with respect to the first set. An entrance aperture 12 is also shown and likewise appears on FIG. 3 The mirrors 10 and 11 have a radius of curvature R, which is shown in FIG. 1, and the convex portion of the lens 9 has the same focal length.

As will appear from the description below, the sequence of reflections by which the eight different images are formed on the interference filters are best expressed by giving the two mirrors 10 and 11 also a letter designating, 10 being referred to as A and 11 as B.

Half of the incoming light beams falls upon the mirror 10A and is reflected to form an image A lying upon interference filter number 6. The other half of the beam falls upon mirror 11B and produces an image B of the entrance aperture lying upon interference filter number 7. The colors which these two filters pass, if present in the incoming beam, will pass through the filters and strike individual detectors behind each filter. As the detectors and their electrical circuits are not in the slightest changed by the present invention from the conventional setup for reading coded ink symbols, they are not illustrated on the drawings in order not to confuse them. Of course the detectors must respond to the colors striking them.

If there are other colors in the beams, interference filters 6 and 7 will reflect them back to the mirrors 10 and 11, with crossing over. In other words, the image A will be reflected onto mirror B and vice versa. This causes two additional images, shown on FIG. 3, on the interference filters 2 and 3 and labeled BA and AB, respectively, in the second row on the lens 9. If these images contain the color which interference filter 2 or interference filter 3 passes, each will go out through and strike its proper detector. Other colors are reflected back, and a third set of images appears on interference filters 5 and 8 in the first row on FIG. 3 and of course are labeled ABA and BAB. Again, if the filters are struck by the color which they pass, this will pass through and activate the detector back of the particular interference filter. Other colors are reflected back again onto the mirrors and this causes an image on interference filters 1 and 4, which are labeled on FIG. 3 as BABA and ABAB, respectively.

It will be noted that the description of the drawings provides for eight interference filters in two rows, staggered, only the upper row having the entrance aperture 12. Where there are fewer components the same sequence results, but there will be missing interference filters. For example, with four components there may be interference filters 2, 3, 6 and 7. Similarly, with six components there will be interference filters 2, 3, 5, 6, 7 and 8; and for eight, of course, the whole number, as shown in FIG. 3.

It is possible, of course, to have more than eight interference filters and so accommodate more than eight different narrow wavelength bands. However, this is rarely needed in coded ink reading because the numbers of usable narrow band photoluminescers is limited and, in general, not more than six or at most eight components will be encountered. However, where polychromatic beams composed of narrow wavelength bands produced in other ways are encountered, there may be situations where more than eight interference filters will be needed. With polychromatic beams having a larger number of wavelength bands this usually will means a wider total band spread of all of the bands, which makes the advantages of the present invention even more marked.

We claim:

1. An optical reader for polychromatic beams containing one or more narrow band colors, comprising in combination, a. pair of spherical half mirrors having identical radii of curvature, b. a planoconvex lens of focal length equal to the mirror radii positioned so that its normal passes symmetrically between the two half mirrors and spaced from the mirrors by a distance equal to its focal length, the convex side of the lens being toward the mirrors, c. an entrance aperture in the center of the planoconvex lens and narrow band interference filters arranged in at least one row on the planar surface of the lens, d. the spherical mirrors being positioned to produce a plurality of images on the planar surface of the lens, one pair by single reflection and other pairs by multiple reflections, each image being centered on a particular interference filter, whereby an image containing the color passed by the interference filter passes through it and all other colors are reflected back to the mirrors.

2. A device according to claim 1 in which the interference filters are in two rows, staggered with respect to each other, and the entrance aperture is between the center pair of interference filters in one of the rows.

3. A device according to claim 2 in which the row having the entrance aperture is composed of four interference filters and the other row is also composed of four filters.